(12) United States Patent
Sekiguchi et al.

(10) Patent No.: US 9,670,985 B2
(45) Date of Patent: Jun. 6, 2017

(54) TOOTHED BELT AND BELT REDUCTION GEAR INCLUDING THE SAME

(71) Applicant: BANDO CHEMICAL INDUSTRIES, LTD., Kobe-shi (JP)

(72) Inventors: Yuji Sekiguchi, Kobe (JP); Eijiro Nakashima, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 172 days.

(21) Appl. No.: 14/617,790

(22) Filed: Feb. 9, 2015

(65) Prior Publication Data

US 2015/0152941 A1 Jun. 4, 2015

Related U.S. Application Data

(63) Continuation of application No. PCT/JP2013/004200, filed on Jul. 5, 2013.

(30) Foreign Application Priority Data

Aug. 9, 2012 (JP) .................................. 2012-176688

(51) Int. Cl.
| | |
|---|---|
| *F16G 1/28* | (2006.01) |
| *F16H 7/02* | (2006.01) |
| *F16G 1/10* | (2006.01) |
| *B62D 5/04* | (2006.01) |

(52) U.S. Cl.
CPC ................ *F16G 1/28* (2013.01); *B62D 5/04* (2013.01); *F16G 1/10* (2013.01); *F16H 7/023* (2013.01)

(58) Field of Classification Search
CPC ...... F16G 1/10; F16G 1/28; B62D 5/04; F16H 7/023
See application file for complete search history.

(56) References Cited

U.S. PATENT DOCUMENTS

| | | | |
|---|---|---|---|
| 4,034,615 A | 7/1977 | Brooks | |
| 2004/0221668 A1* | 11/2004 | Saruwatari | B62D 5/0412 74/388 PS |
| 2005/0121251 A1 | 6/2005 | Ueno et al. | |

(Continued)

FOREIGN PATENT DOCUMENTS

| | | |
|---|---|---|
| JP | 53-029446 | 3/1978 |
| JP | 62-004673 A | 1/1987 |

(Continued)

OTHER PUBLICATIONS

International Search Report mailed Sep. 24, 2013 in corresponding international application No. PCT/JP2013/004200.

*Primary Examiner* — William E Dondero
*Assistant Examiner* — Robert T Reese
(74) *Attorney, Agent, or Firm* — Knobbe Martens Olson & Bear LLP

(57) ABSTRACT

A toothed belt includes: a back portion; and a plurality of helical teeth provided on an inner periphery of the back portion and disposed at a fixed pitch in a belt longitudinal direction. An angle θ between a tooth trace direction of the helical teeth and a belt lateral direction is in a range of 7 degrees to 10 degrees, both inclusive. A ratio A of a thickness tb of the back portion to a tooth height hb of the helical teeth, which is given by A=100×tb/hb, is in a range of 120% to 240%, both inclusive.

12 Claims, 6 Drawing Sheets

(56) References Cited

U.S. PATENT DOCUMENTS

| | | | | |
|---|---|---|---|---|
| 2006/0287148 A1* | 12/2006 | Wood | ................. | C08L 23/16 |
| | | | | 474/260 |
| 2006/0287434 A1* | 12/2006 | Wood | ................. | C08L 21/00 |
| | | | | 525/192 |
| 2010/0197434 A1* | 8/2010 | Sekiguchi | ............ | B29C 33/64 |
| | | | | 474/205 |
| 2012/0071286 A1* | 3/2012 | Pasch | ................ | B29D 29/08 |
| | | | | 474/205 |
| 2014/0206487 A1* | 7/2014 | Tomobuchi | .......... | C08K 3/00 |
| | | | | 474/205 |

FOREIGN PATENT DOCUMENTS

| | | |
|---|---|---|
| JP | 06-049489 U | 7/1994 |
| JP | 2004-314770 A | 11/2004 |
| JP | 2005-029145 A | 2/2005 |
| JP | 2006-153249 A | 6/2006 |

\* cited by examiner

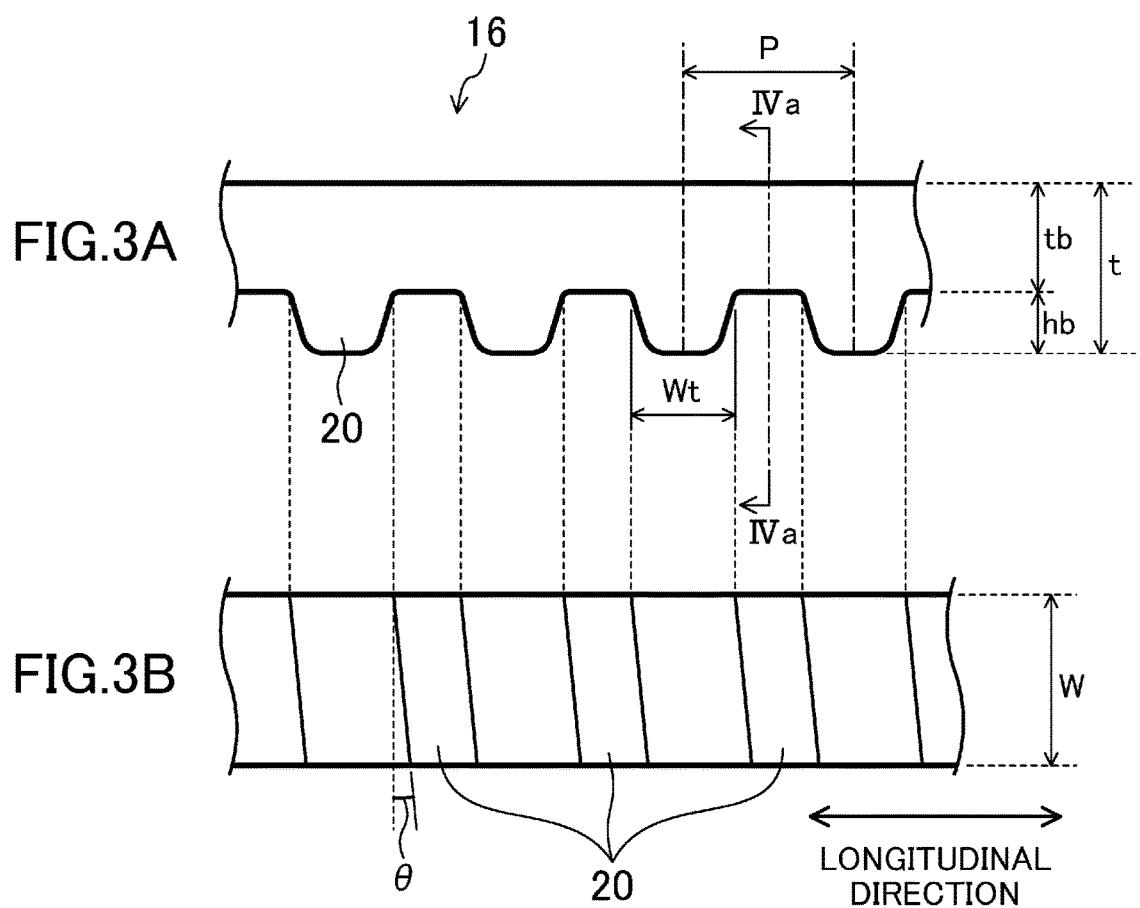

TOOTHED BELT AND BELT REDUCTION GEAR INCLUDING THE SAME

CROSS-REFERENCE TO RELATED APPLICATIONS

This is a continuation of International Application No. PCT/JP2013/004200 filed on Jul. 5, 2013, which claims priority to Japanese Patent Application No. 2012-176688 filed on Aug. 9, 2012. The entire disclosures of these applications are incorporated by reference herein.

BACKGROUND

The technique disclosed in the present application relates to toothed belts for use in power steering systems.

A technique of using a reduction gear with a belt for electric power steering is known in the art. For example, Japanese Unexamined Patent Publication No. S62-004673 discloses a belt reduction gear using a friction type belt, a so-called V-belt. In this belt reduction gear, since power is transmitted by friction, a large tensile force need be applied to the belt to obtain a sufficient friction force. Accordingly, in the case of using the belt reduction gear described in Japanese Unexamined Patent Publication No. S62-004673, no-load torque is increased, and a steering wheel tends to return slowly.

Japanese Examined Utility Model Publication No. H06-049489 discloses a belt reduction gear using a spur toothed belt (toothed belt). In this type of belt reduction gear, power is transmitted as the teeth of a pulley mesh with the teeth of a belt. Accordingly, a large tensile force need not be applied to the belt as compared to the case of using the V-belt, and no-load torque can be reduced.

In the belt reduction gear using the toothed belt, however, specific operating noise is generated at the start and end of engagement between the teeth of the pulley and the teeth of the belt during rotation of the belt reduction gear. This problem can be reduced to some degree by reducing the size of the teeth of the belt. However, reducing the size of the teeth of the belt decreases strength of the teeth. The decrease in strength of the teeth may cause shearing of the teeth when a large force is applied to the teeth, which may cause undesirable engagement of the sheared teeth. Thus, a speed reduction mechanism may be locked, and steering may become impossible. Accordingly, if the size of the teeth of the belt is reduced in order to reduce the operating noise, the belt width need be increased to ensure the strength of the teeth. This increases the size of the reduction gear, making it difficult to place the reduction gear in a vehicle body. Increasing the belt width also causes an increase in noise.

A pulley having helical teeth and a toothed belt having helical teeth that mesh with the helical teeth of the pulley are therefore used as a solution (see Japanese Unexamined Patent Publication Nos. 2005-29145 and 2004-314770). The term "helical teeth" refers to the teeth whose tooth trace is tilted at a predetermined angle with respect to the belt lateral direction perpendicular to the traveling direction of the belt when this term is used for the belt, and with respect to the pulley lateral direction perpendicular to the rotational direction of the pulley when this term is used for the pulley. In the case of using the toothed belt having the helical teeth, the tooth of the belt meshes with the tooth of the pulley continuously from one end of the tooth to the other when the reduction gear is in operation. This can reduce noise that is generated when the teeth engage with each other.

SUMMARY

However, as automobiles are becoming increasingly quieter, it has been increasingly desired to further reduce noise that is generated by belt reduction gears.

A toothed belt disclosed in this specification can sufficiently reduce noise and vibrations when used in power steering systems etc.

A toothed belt for a power steering system according to an embodiment of the present disclosure includes: a back portion comprised of an elastic material; and a plurality of helical teeth provided on an inner periphery of the back portion and disposed at a fixed pitch in a belt longitudinal direction, wherein an angle θ between a tooth trace direction of the helical teeth and a belt lateral direction is in a range of 7 degrees to 10 degrees, both inclusive, and a ratio A of a thickness tb of the back portion to a tooth height hb of the helical teeth, which is given by A=100×tb/hb, is in a range of 120% to 240%, both inclusive.

According to this configuration, since the helix angle θ of the helical teeth are in the range of 7 degrees to 10 degrees, both inclusive, noise can be significantly reduced as compared to the case where the helix angle θ is set to a value outside this range.

According to the above toothed belt, since the ratio A of the thickness tb of the back portion to the tooth height hb of the helical teeth is in the range of 120% to 240%, both inclusive, the compressive elastic modulus of the helical teeth and the back portion can be increased and the vibration damping effect can be enhanced while ensuring reliability.

The above toothed belt is preferably used in belt reduction gears for power steering.

BRIEF DESCRIPTION OF THE DRAWINGS

FIG. 3A is an enlarged side view showing a part of a toothed belt according to the embodiment of the present disclosure, and FIG. 3B is a plan view showing the part of the toothed belt as viewed from the helical tooth side.

DETAILED DESCRIPTION

Configuration of Belt Reduction Gear and Toothed Belt

A toothed belt according to an embodiment of the present disclosure and a belt reduction gear using the same will be described in detail below with reference to the accompanying drawings.

Figure 1:
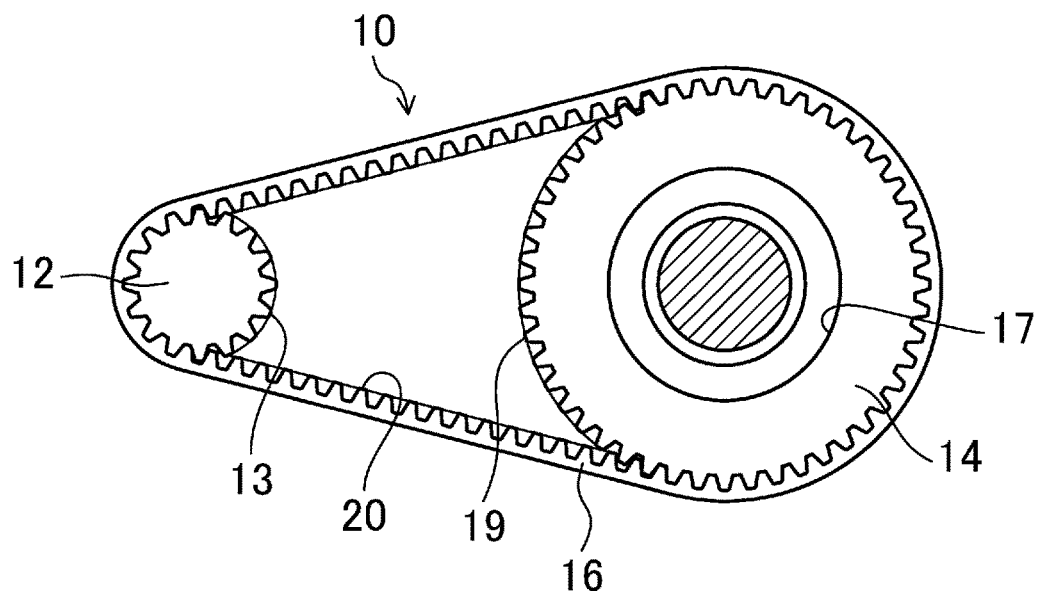
FIG. 1 is a side view of a belt reduction gear according to an embodiment of the present disclosure.

FIG. 1 is a side view of a belt reduction gear according to an embodiment of the present disclosure. As shown in the figure, a belt reduction gear 10 has a drive pulley 12 having a plurality of helical teeth 13 formed at a predetermined pitch, a driven pulley 14 having a plurality of helical teeth 19 formed at a predetermined pitch, and a toothed belt 16 having helical teeth 20 that mesh with the helical teeth 13 and the helical teeth 19 and being wound around the drive pulley 12 and the driven pulley 14.

This belt reduction gear is used in automobile power steering systems. For example, in the case of an exemplary electric power steering system (not shown), rotation of a steering wheel is transmitted to an input shaft in response to operation of the steering wheel, and rotation of the input shaft is transmitted to a pinion via a torsion bar while twisting the torsion bar. As rotation of the pinion is transmitted to a rack shaft, the rack shaft is moved in the axis direction. In response to detection of the twist amount of the torsion bar by a torque detection device, an output signal of the torque detection device is applied to a control device, and the control device rotates an assist motor. The rotation force of the assist motor is transmitted from the drive pulley 12 to the toothed belt 16 and the driven pulley 14. With this operation, the operation of the steering wheel is assisted by the assist motor.

The drive pulley 12 and the driven pulley 14 rotate according to the direction in which the driver turns the steering wheel, and the toothed belt 16 travels forward or rearward in the longitudinal direction (belt longitudinal direction). The toothed belt 16 thus rotates while the driver is turning the steering wheel. The maximum rotational speed of the drive pulley 12 is, e.g., about 5,000 rpm. The toothed belt 16 of the present embodiment is preferably used in electric power steering systems.

Figure 2:
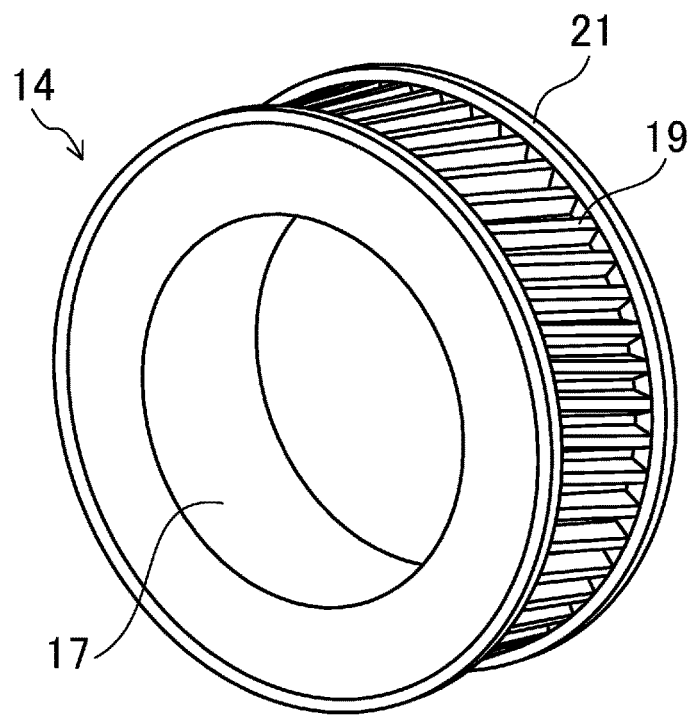
FIG. 2 is a perspective view of a driven pulley.

FIG. 2 is a perspective view of the driven pulley 14. As shown in the figure, the helical teeth 19 are formed on the outer peripheral surface of the driven pulley 14, and for example, a flange 21 for retaining the belt on the driven pulley 14 is formed on the outer peripheral edge of the driven pulley 14. The driven pulley 14 has a through hole 17 through which a rack shaft of a power steering system, not shown, is inserted. Typically, no flange is formed on the outer peripheral edge of the drive pulley 12.

The diameter and the number of teeth of the drive pulley 12 and the diameter and the number of teeth of the driven pulley 14 are determined as appropriate according to the required reduction gear ratio. The diameter of the drive pulley 12 is, e.g., about 17 mm to 32 mm, and the number of teeth of the drive pulley 12 is, e.g., about 28 to 50. The diameter of the driven pulley 14 is, e.g., about 64 mm to 102 mm, and the number of teeth of the driven pulley 14 is, e.g., about 100 to 160. The gear ratio of the driven pulley 14 to the drive pulley 12 (=(number of teeth of the driven pulley)/(number of teeth of the drive pulley)) is about 2.2 to 4.0, and the outer diameter ratio of the driven pulley 14 to the drive pulley 12 (=(diameter of the driven pulley)/diameter of the drive pulley)) is about 2.2 to 4.0.

The pitch of the helical teeth 13 and the pitch of the helical teeth 19 are in the range of, e.g., about 2 mm to 3 mm, both inclusive. The angle between the tooth trace direction of the helical teeth 13 and the thickness direction of the drive pulley 12 and the angle between the tooth trace direction of the helical teeth 19 and the thickness direction of the driven pulley 14 is in the range of, e.g., 7 degrees to 10 degrees, both inclusive.

FIG. 3A is an enlarged side view showing a part of the toothed belt 16 according to the embodiment of the present disclosure, and FIG. 3B is a plan view showing the part of the toothed belt 16 as viewed from the helical tooth 20 side. In FIG. 3A, the back surface (upper surface) of the belt is shown as a flat surface. However, the actual toothed belt 16 is in the form of an endless ring when not wound around the pulleys.

Figure 4A:
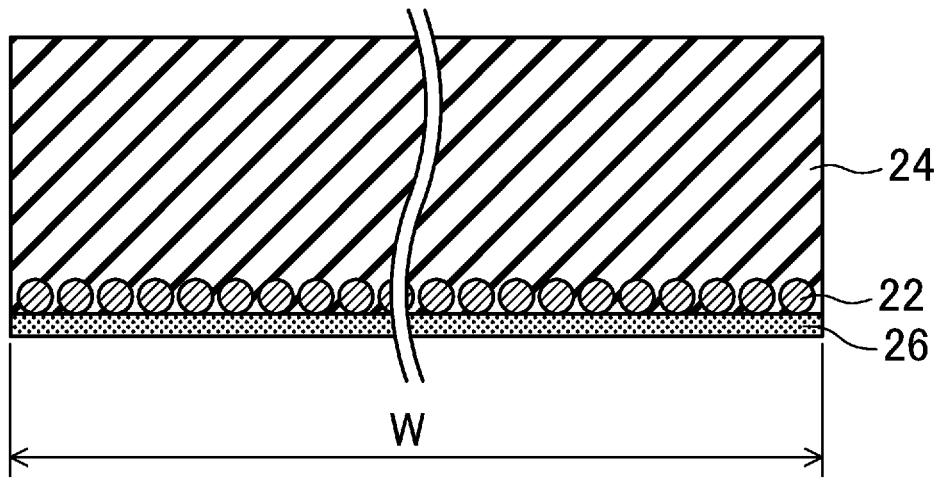
FIG. 4A is a sectional view of the toothed belt according to the embodiment of the present disclosure taken along line IVa-IVa in FIG. 3A.
Figure 4B:
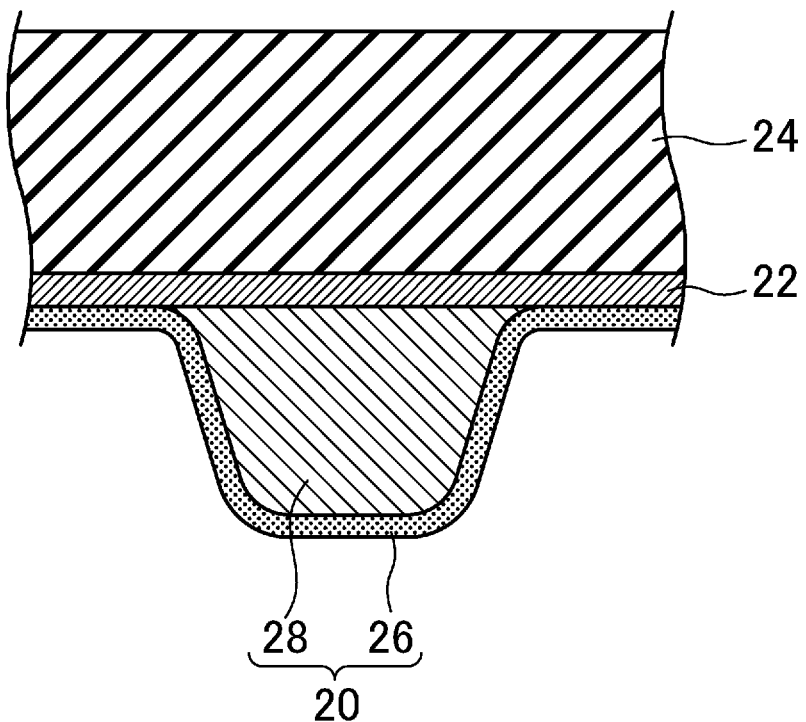
FIG. 4B is an enlarged sectional view of the toothed belt in the belt longitudinal direction.

FIG. 4A is a sectional view of the toothed belt 16 according to the embodiment of the present disclosure taken along line IVa-IVa in FIG. 3A, and FIG. 4B is an enlarged sectional view of the toothed belt 16 in the belt longitudinal direction.

As shown in FIGS. 3A and 3B, the helical teeth 20 are formed at a predetermined pitch P on the inner periphery of the toothed belt 16, and the pitch P is substantially the same as that of the helical teeth 13, 19, and is in the range of, e.g., 2 mm to 3 mm, both inclusive. As used herein, the term "pitch P" refers to the distance between the centers in the belt longitudinal direction of adjoining ones of the helical teeth 20. The width Wt in the belt longitudinal direction of each helical tooth 20 is in the range of, e.g., about 1.30 mm to 1.95 mm, both inclusive.

The belt width W of the toothed belt 16 is in the range of, e.g., 20 mm to 40 mm, both inclusive. The peripheral length of the toothed belt 16 is determined as appropriate according to the pulley diameters etc., and is, e.g., about 300 mm to 400 mm.

The angle (also referred to as the "helix angle") θ between the tooth trace direction of the helical teeth 20 and the belt lateral direction is in the range of 7 degrees to 10 degrees, both inclusive. The tooth trace of the helical teeth 20 may extend either upward to the right or upward to the left with respect to the belt lateral direction as a horizontal reference as long as the angle θ is in the range of 7 degrees to 10 degrees, both inclusive. The helix angle θ of the helical teeth 20 is substantially the same as that of the helical teeth 13 of the drive pulley 12 and that of the helical teeth 19 of the driven pulley 14. The ratio (contact overlap ratio) ϵ at which the period during which one helical tooth 20 meshes with the helical tooth 13, 19 of the pulley overlaps the period during which the subsequent helical tooth 20 meshes with the helical tooth 13, 19 of the pulley, which is given by ϵ=W·tan θ/P, satisfies $-2.53 \leq 1-\epsilon \leq 0.18$.

As shown in FIGS. 4A and 4B, the toothed belt 16 according to the present embodiment has a ring-shaped back portion 24 made of an elastic material, a cord 22 embedded in, e.g., the inner periphery of the back portion 24 so as to extend in the belt longitudinal direction, and the helical teeth 20 provided on the inner periphery of the back portion 24.

Each helical tooth 20 has tooth rubber 28 and tooth cloth 26 that covers the inner peripheral surface of the tooth rubber 28. In a region between adjoining ones of the helical teeth 20, the tooth cloth 26 may be in direct contact with the cord 22 or the back portion 24, or may be in contact with the cord 22 or the back portion 24 with a thinned part of the tooth rubber 28 interposed therebetween.

A constituent material of the back portion 24 and the tooth rubber 28 is rubber capable of withstanding temperatures in the range of about as low as −40° C. to about as high as 120° C. For example, hydrogenated nitrile rubber (HNBR) is preferably used. Other examples of the constituent material of the back portion 24 and the tooth rubber 28 include chloroprene rubber (CR), ethylene-propylene-diene rubber (EPDM), styrene-butadiene rubber, epichlorohydrin rubber, polyurethane rubber, etc. Known reinforcing fibers etc. or a known additive may be added to these rubbers.

The cord 22 is placed in, e.g., a helical pattern near the boundary between the inner periphery of the back portion 24 and the tooth rubber 28 or the tooth cloth 26. A plurality of cords 22 may be provided. Since the toothed belt 16 has the helical teeth 20, the belt tends to move toward the edge of the pulley when the belt reduction gear 10 is in operation. As a solution to this, a plurality of cords 22 may be formed by combining, e.g., S-twist yarn and Z-twist yarn as appropriate so as to reduce a thrust force due to the helical teeth 20. A highly elastic material is preferably used as the cord 22. For example, glass fibers are preferably used. Aramid fibers may be used as the cord 22.

For example, nylon fibers, nylon fibers containing aramid fibers, etc. are preferably used as a material of the tooth cloth 26. The thickness of the tooth cloth 26 is in the range of, e.g., about 0.30 mm to 0.50 mm, both inclusive. Nylon fibers such as 6,6-nylon or 4,6-nylon, aramid fibers, polyparaphenylene benzobisoxazole (PBO) fibers, etc. may be used as the material of the tooth cloth 26.

In the toothed belt 16 according to an example of the present disclosure, the back portion 24 is thicker than in the conventional toothed belts. Specifically, the ratio A of the thickness tb of the back portion 24 to the tooth height hb of the helical teeth 20, which is given by $A=100 \times tb/hb$, is in the range of 120% to 240%, both inclusive. Setting the ratio A in this range can significantly reduce the noise level that is generated by the belt reduction gear 10 using this toothed belt 16 as compared to the belt reduction gears using the conventional toothed belts. The ratio A in the range of 175% to 240%, both inclusive, is more preferable as the noise level during driving can further be reduced. In the case where the back portion 24 and the tooth rubber 28 are formed of HNBR, it is preferable that the tooth height hb of the helical teeth 20 be in the range of, e.g., about 0.76 mm to 1.14 mm, both inclusive, and the total thickness t of the toothed belt 16 (thickness from the back surface of the belt to the top land of the helical tooth) be in the range of, e.g., about 1.67 mm to 3.88 mm, both inclusive.

The helical teeth 20 are compressed in the state where the toothed belt 16 is wound around the drive pulley 12 and the driven pulley 14 such that the helical teeth 20 mesh with the helical teeth 13, 19. The compression ratio B of the tooth height hb of the helical teeth 20 with respect to the groove depth hp of the drive pulley 12 and the driven pulley 14, which is given by $B=100 \times (hb-hp)/hb$, is $B \leq 1.4\%$.

Figure 5:
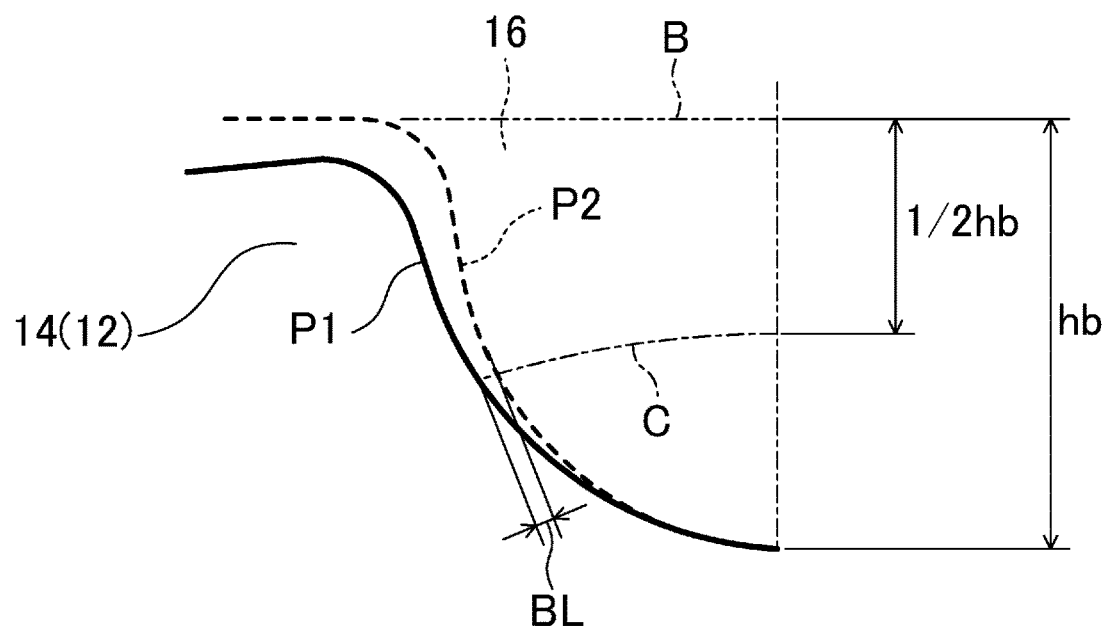
FIG. 5 is a diagram schematically showing the state where a helical tooth meshes with a groove of a pulley in the belt reduction gear according to the embodiment of the present disclosure.

FIG. 5 is a diagram schematically showing the state where the helical tooth 20 meshes with a groove of the pulley. Although the driven pulley 14 is shown as an example in the figure, the groove of the drive pulley 12 has substantially the same shape. In FIG. 5, P1 is a line showing the tooth profile of the driven pulley 14 (or the drive pulley 12), and P2 is a line showing the tooth profile of the toothed belt 16. A straight line B as a two-dot chain line is a reference line passing through the bottom land of the toothed belt 16. A chain line arc C is an arc passing through a point located at a distance (0.5 hb) equal to half the tooth height hb of the toothed belt 16 from the reference line B, and the center of the arc matches the center of the driven pulley (the drive pulley 12).

As shown in FIG. 5, predetermined backlash BL is present in the state where the toothed belt 16 meshes with the driven pulley 14 and the drive pulley 12. The backlash BL is defined as the distance between the helical tooth 19 (or the helical tooth 13) of the pulley and the helical tooth 20 of the toothed belt 16 at a position along the arc C. This backlash BL is set so as to satisfy $1.7\% \leq C \leq 2.5\%$, where C represents the ratio of the backlash BL to the tooth pitch P of the helical teeth 20 and is given by $C=100 \times BL/P$. This range $1.7\% \leq C \leq 2.5\%$ is satisfied both between the driven pulley 14 and the toothed belt 16 and between the drive pulley 12 and the toothed belt 16.

The configuration of the toothed belt 16 and the belt reduction gear 10 is described above by way of example only, and the shapes, constituent materials, etc. of the toothed belt 16 and the belt reduction gear 10 can be modified as appropriate without departing from the spirit and scope of the disclosure.

Effects and Advantages of the Toothed Belt According to the Example of the Present Disclosure According to the toothed belt 16 of the present embodiment, the helix angle θ of the helical teeth 20 is 7 degrees or more. This allows the tooth of the belt to mesh with the tooth of the pulley more smoothly from one end of the tooth to the other when the belt reduction gear 10 is in operation, and can effectively reduce noise that is generated when the teeth engage with each other. If the helix angle θ of the helical teeth of the belt is larger than 10 degrees, a larger thrust force is applied to the belt wound around the pulley. As a result, the belt moves more toward one side on the pulley, and rubbing noise is generated between the side surface of the belt and the flange of the pulley, which may increase overall noise.

In the toothed belt 16 of the present embodiment, since the helix angle θ of the helical teeth 20 is in the range of 7 degrees to 10 degrees, both inclusive, noise can be significantly reduced as compared to the case where the helix angle θ is set to a value outside this range.

In the toothed belt 16 of the present embodiment, the contact overlap ratio ε, which is given by $\epsilon = W \cdot \tan \theta / P$, satisfies $-2.53 \leq 1-\epsilon \leq 0.18$. This allows the toothed belt 16 to continuously and smoothly mesh with the drive pulley 12 or the driven pulley 14, and therefore can reduce noise.

Moreover, in the toothed belt 16 of the present embodiment, the ratio A of the thickness tb of the back portion 24 to the tooth height hb of the helical teeth, which is given by $A=100 \times tb/hb$, is in the range of 120% to 240%, both inclusive. The use of the ratio A of 120% or more increases the compressive elastic modulus of the tooth rubber 28 and the back portion 24, and can therefore enhance the vibration damping effect.

Under these conditions, even if the ratio A is higher than 240%, the noise level is reduced as the thickness of the toothed belt 16 increases. However, rigidity of the belt increases if the thickness of the belt is increased excessively. The teeth of the belt therefore do not mesh with the teeth of the pulley, which increases the noise level. In addition, if the ratio A is higher than 240%, the rigidity of the belt increases in the back portion thereof. This increases bending fatigue of the belt on the pulley, whereby the belt tends to crack particularly in a low temperature environment.

Therefore, according to the toothed belt 16 of the present embodiment, the ratio A is set in the range of 120% to 240%, both inclusive, whereby vibrations and noise during operation can be effectively reduced while ensuring a sufficient life of the belt reduction gear. If the ratio A is in the range of 175% to 240%, both inclusive, vibrations and noise during operation can further be reduced. The use of the back portion 24 having a thickness in the range of 0.91 mm to 2.74 mm, both inclusive, can also effectively reduce vibrations and noise during operation while ensuring a sufficient life of the belt reduction gear.

In the belt reduction gear 10 of the present embodiment, the compression ratio B of the tooth height hp of the helical teeth 20 with respect to the groove depth hp of the drive pulley 12 and the driven pulley 14, which is given by B=100×(hb−hp)/hb, is B≤1.4%.

Accordingly, the belt reduction gear 10 of the present embodiment can reduce the impact between the tooth surfaces when the helical teeth 20 mesh with the helical teeth 13, 19 as compared to the case where the compression ration B is higher than 1.4%, whereby noise can be reduced.

Moreover, in the belt reduction gear 10, the ratio C of the backlash BL between the toothed belt 16 and the drive and driven pulleys 12, 14 to the tooth pitch P of the helical teeth 20, which is given by C=100×BL/P, is 1.7%≤C≤2.5%.

The tooth tip part of the helical tooth 13, 19 and the tooth root part of the helical tooth 20 are thus in partial contact with each other, or is held in a state closer to the partial contact state. Interference is thus eliminated which occurs when the toothed belt 16 and the pulley mesh with and separate from each other. This can further reduce noise that is generated during rotation of the toothed belt 16.

The tooth pitch of the toothed belt 16 is not particularly limited, but is preferably in the range of 2 mm to 3 mm, both inclusive. The tooth pitch of 2 mm or more ensures that the teeth of the belt have a sufficient size, whereby sufficient torque can be obtained when the toothed belt 16 is used for electric power steering. The tooth pitch of 3 mm or less ensures that the number of teeth of the pulley does not become too small. Accordingly, the toothed belt 16 will not be wound in a polygonal shape around the pulley, which can suppress noise that is generated as the tooth belt 16 does not conform to the shape of the pulley.

In the toothed belt 16 and the belt reduction gear 10 using the same according to the present embodiment, vibrations and noise during operation can be sufficiently reduced, and in particular, steering feeling of electric power steering can be significantly improved due to the combined effects of the above configurations. Moreover, due to the low vibrations and noise during operation, the toothed belt 16 and the belt reduction gear 10 using the same according to the present embodiment can be preferably used not only for recent gasoline vehicles with reduced noise but also for hybrid vehicles and electric vehicles.

With the above configurations, the toothed belt 16 can reduce vibrations and noise even if the belt width W is in the range of 20 mm to 40 mm, both inclusive. A compact belt reduction gear 10 can therefore be implemented.

Manufacturing Method of Toothed Belt

An example of a manufacturing method of the toothed belt 16 will be described below. This manufacturing method uses a cylindrical mold and a vulcanizer in which the cylindrical mold can be fitted. Grooves for forming the plurality of helical teeth 20 are provided at the same pitch in the circumferential direction on the outer peripheral surface of the cylindrical mold so as to be tilted at the helix angle θ with respect to the axial direction.

First, a fiber material such as nylon for the tooth cloth 26 is prepared, and one surface of the fiber material is coated with rubber cement with a knife coater or a roll coater. The fiber material is then formed into a cylindrical shape so that the surface coated with the rubber cement comprised of HNBR etc. faces outward.

In addition, an unvulcanized rubber composition sheet for forming the back portion 24 of the toothed belt 16 and twist yarn of glass fibers for forming the cord 22 are prepared.

Thereafter, the fiber material is placed around the cylindrical mold, and the twist yarn is helically wound therearound at the same pitch. Moreover, the unvulcanized rubber composition sheet is wound therearound. At this time, the layers of the fiber material, the twist yarn, and the unvulcanized rubber composition sheet have been sequentially placed in this order from the mold side on the peripheral surface of the cylindrical mold.

Subsequently, the cylindrical mold having these materials placed thereon is placed in the vulcanizer, and is subjected to a predetermined temperature and pressure. At this time, the unvulcanized rubber composition flows and is pressed into the grooves of the cylindrical mold so as to press the fiber cloth against the grooves. The helical teeth 20 are formed in this manner.

Lastly, the cylindrical mold is removed from the vulcanizer. The cylindrical belt precursor formed on the peripheral surface of the cylindrical mold is removed and cut into rings with a predetermined width. The toothed belts 16 are thus produced.

The manufacturing method of the toothed belt 16 is not limited to the method described above, and other methods may be used as appropriate.

EXAMPLES

The result of noise tests conducted for the toothed belts will be described below.

(Test Evaluation Belt 1)

The following toothed belts of examples and comparative examples were produced. The toothed belts according to the examples and the comparative examples used the same materials for the back portion, the tooth rubber, the cord, and the tooth cloth. In these toothed belts, the tooth pitch of the helical teeth was 2 mm, and the tooth height was 0.76 mm, but the following parameters were varied as follows. That is, as shown in Table 1, the toothed belts were produced so that the total thicknesses of the belts were 1.31 mm (A=72), 1.47 mm (A=93), 1.67 mm (A=120), 1.90 mm (A=150), 2.10 mm (A=176), 2.22 mm (A=192), 2.34 mm (A=208), 2.46 mm (A=224), 2.58 mm (A=239), 2.70 mm (A=255), and 2.90 mm (A=282), and the helix angles of the helical teeth were 5 degrees, 7 degrees, 9 degrees, 10 degrees, and 12 degrees. The total thickness of the belt is the sum of the thickness of the back portion and the tooth height.

The toothed belts were produced by the method described above. HNBR was used as a constituent material of the back portion and the tooth rubber of the toothed belt, and glass fibers were used as the cord. Cloth using 6,6-nylon as warp and weft was used as the tooth cloth. The belt width was 28 mm and the peripheral length of the belt was 322 mm at the compression ratio of 0%.

(Test Evaluation Belt 2)

The following toothed belts of examples and comparative examples were produced. The toothed belts according to the examples and the comparative examples used the same materials for the back portion, the tooth rubber, the cord, and the tooth cloth as those used in the toothed belts described above in "Test Evaluation Belt 1." In these toothed belts, the tooth pitch of the helical teeth was 3 mm, and the tooth height was 1.14 mm, but the following parameters were varied as follows. That is, as shown in Table 2, the toothed belts were produced so that the total thicknesses of the belts were 2.10 mm (A=84), 2.30 mm (A=102), 2.50 mm (A=119), 2.70 mm (A=137), 2.90 mm (A=154), 3.10 mm (A=172), 3.30 mm (A=189), 3.50 mm (A=207), 3.70 mm (A=225), 3.90 mm (A=242), and 4.15 mm (A=264), and the helix angles of the helical teeth were 5 degrees, 7 degrees, 9 degrees, 10 degrees, and 12 degrees.

The belt width was 25 mm and the peripheral length of the belt was 324 mm at the compression ratio of 0%.

(Evaluation Method)

The toothed belts with a tooth pitch of 2 mm (described in "Test Evaluation Belt 1") were evaluated by the following method.

The belt to be evaluated was wound around two-axis pulleys, namely a drive pulley and a driven pulley, and the noise level was measured at various rotational speeds of the drive pulley in the range of 500 to 5,000 rpm. The number of teeth of the drive pulley was 41, the number of teeth of the driven pulley was 111, and the tooth pitch of each pulley was 2 mm. The diameters of the drive pulley and the driven pulley were 26.10 mm and 70.66 mm, respectively. The helix angle of the teeth of each pulley was the same as that of the teeth of the belt to be evaluated. The tensile force of the belt was 100 N, and the noise level was measured with a precision sound level meter (made by ONO SOKKI CO., LTD., Model No. LA-5560). A sound collecting microphone was placed 30 mm away from the belt end face in the lateral direction (belt lateral direction), and 20 mm away from the center of the drive pulley toward the center of the driven pulley. The measurement was carried out at 400 points in the range of 500 rpm to 5,000 rpm for each belt, and average values of the measurement results at the 400 points are shown on the right side of Table 1.

The toothed belts with a tooth pitch of 3 mm (described in "Test Evaluation Belt 2") were evaluated by a method similar to that for the toothed belts with a tooth pitch of 2 mm. However, the number of teeth of the drive pulley was 28, the number of teeth of the driven pulley was 74, and the tooth pitch of each pulley was 3 mm. The measurement was carried out at 400 points in the range of 500 rpm to 5,000 rpm for each belt, and average values of the measurement results at the 400 points are shown on the right side of Table 2.

(Test Evaluation Result)

Figure 6:
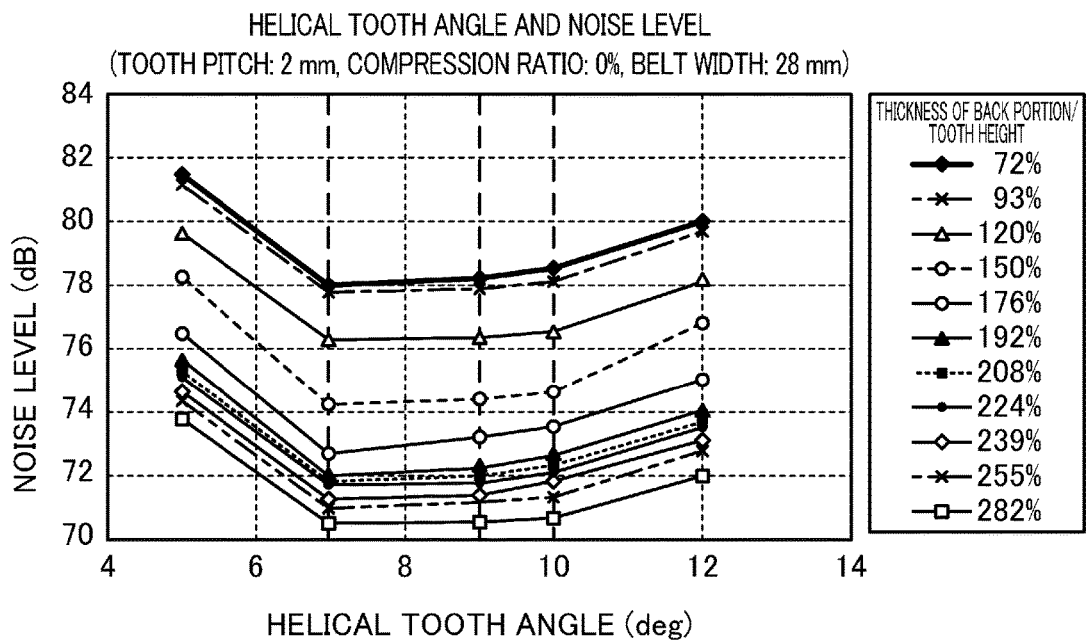
FIG. 6 is a diagram showing the relation between the helix angle of helical teeth and the noise level in toothed belts with a tooth pitch of 2 mm.
Figure 7:
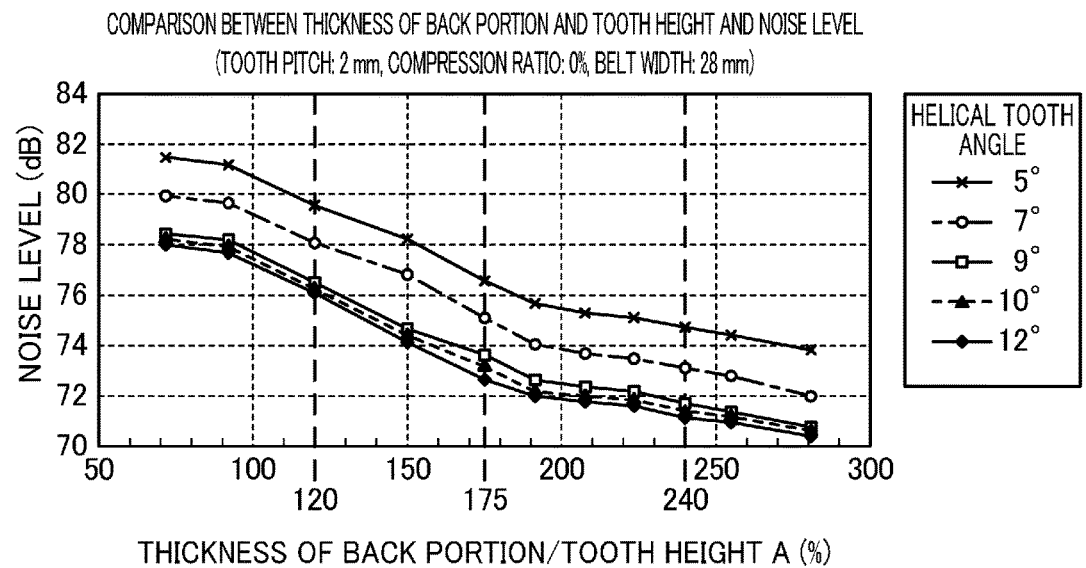
FIG. 7 is a diagram showing the relation between the ratio A (%) of the thickness of a back portion to the tooth height and the noise level in the toothed belts with a tooth pitch of 2 mm.

The result of test evaluation of the toothed belts with a tooth pitch of 2 mm is shown on the right side of Table 1 (the numerical values are shown in dB). On the right side of Table 1, those measurement results in which the helix angle of the helical teeth was in the range of 7 degrees to 10 degrees, both inclusive, and the ratio A was in the range of 120% to 240%, both inclusive, are shown bold and underlined as the results of the examples (21 examples). FIG. 6 is a diagram illustrating the result shown Table 1, where the abscissa represents the helical tooth angle of the toothed belt, and the ordinate represents the noise level. FIG. 7 is a diagram illustrating the result shown in Table 1, where the abscissa represents the ratio A, and the ordinate represents the noise level.

TABLE 1

| | Total Thickness (mm) | Tooth Height (mm) | Comparison A (%) | Angle (deg) | | | | |
|---|---|---|---|---|---|---|---|---|
| | | | | 5° | 7° | 9° | 10° | 12° |
| A: Thickness of Back Portion/ Tooth Height | 1.31 | 0.76 | 72 | 81.5 | 78.0 | 78.2 | 78.5 | 80.0 |
| | 1.47 | 0.76 | 93 | 81.2 | 77.8 | 77.9 | 78.1 | 79.7 |
| | 1.67 | 0.76 | 120 | 79.7 | 76.3 | 76.4 | 76.5 | 78.2 |
| | 1.90 | 0.76 | 150 | 78.2 | 74.2 | 74.4 | 74.6 | 76.8 |
| | 2.10 | 0.76 | 176 | 76.5 | 72.7 | 73.2 | 73.5 | 75.0 |
| | 2.22 | 0.76 | 192 | 75.7 | 72.0 | 72.2 | 72.6 | 74.0 |
| | 2.34 | 0.76 | 208 | 75.3 | 71.8 | 72.0 | 72.3 | 73.7 |
| | 2.46 | 0.76 | 224 | 75.1 | 71.7 | 71.8 | 72.1 | 73.5 |
| | 2.58 | 0.76 | 239 | 74.7 | 71.3 | 71.4 | 71.8 | 73.1 |
| | 2.70 | 0.76 | 255 | 74.4 | 71.0 | 71.2 | 71.3 | 72.8 |
| | 2.90 | 0.76 | 282 | 73.8 | 70.5 | 70.5 | 70.7 | 72.0 |

The results shown in Table 1 and FIG. 6 show that the noise level was able to be effectively reduced in the case where the helix angle of the helical teeth was in the range of 7 degrees to 10 degrees, both inclusive, as compared to the case where the helix angle of the helical teeth was smaller than 7 degrees or larger than 10 degrees. These results also show that if the helix angle of the helical teeth was the same, the noise level was further reduced as the ratio A of the thickness of the back portion to the tooth height increased in the range of 72% to 282%.

The results shown in Table 1 and FIG. 7 show that even if the helix angle of the helical teeth was any of 7 degrees, 9 degrees, and 10 degrees, the noise level was able to be effectively reduced by setting the ratio A (%) of the thickness of the back portion to the tooth height to 120% or more, and the noise level was able to be further reduced by setting the ratio A to 175% or more. In the measurement range, the noise level was reduced as the ratio A of the thickness of the back portion to the tooth height increased. However, if this ratio A is higher than 240%, durability of the belt is reduced, which is not preferable for practical applications. Accordingly, the ratio A is preferably in the range of 120% to 240%, both inclusive, and more preferably in the range of 175% to 240%, both inclusive.

The result of test evaluation of the toothed belts with a tooth pitch of 3 mm is shown on the right side of Table 2 (the numerical values are shown in dB). On the right side of Table 2, those measurement results in which the helix angle of the helical teeth was in the range of 7 degrees to 10 degrees, both inclusive, and the ratio A was in the range of 120% to 240%, both inclusive, are shown bold and underlined as the results of the examples (18 examples).

TABLE 2

| | Total Thickness (mm) | Tooth Height (mm) | Comparison A (%) | Angle (deg) 5° | 7° | 9° | 10° | 12° |
|---|---|---|---|---|---|---|---|---|
| A: Thickness of Back Portion/ Tooth height | 2.10 | 1.14 | 84 | 82.5 | 79.4 | 78.7 | 79.6 | 81.0 |
| | 2.30 | 1.14 | 102 | 82.0 | 78.9 | 79.3 | 78.6 | 81.1 |
| | 2.50 | 1.14 | 119 | 80.6 | 77.2 | 77.5 | 77.0 | 78.8 |
| | 2.70 | 1.14 | 137 | 79.3 | 75.6 | 75.5 | 75.1 | 77.3 |
| | 2.90 | 1.14 | 154 | 77.7 | 73.4 | 74.5 | 74.2 | 75.7 |
| | 3.10 | 1.14 | 172 | 76.3 | 72.5 | 73.3 | 73.2 | 74.5 |
| | 3.30 | 1.14 | 189 | 76.1 | 73.1 | 72.5 | 72.9 | 74.2 |
| | 3.50 | 1.14 | 207 | 75.8 | 72.6 | 72.7 | 72.7 | 74.5 |
| | 3.70 | 1.14 | 225 | 75.8 | 72.3 | 72.6 | 72.4 | 73.8 |
| | 3.90 | 1.14 | 242 | 75.4 | 71.5 | 72.5 | 72.5 | 73.9 |
| | 4.15 | 1.14 | 264 | 74.6 | 71.6 | 71.4 | 71.8 | 72.7 |

Figure 8:
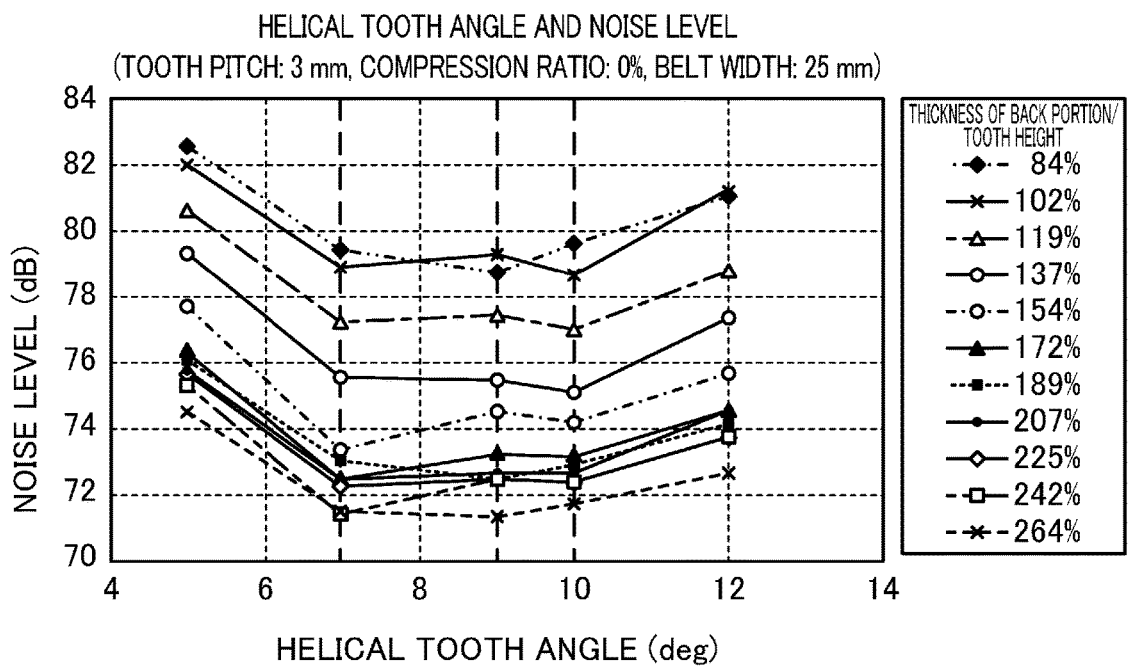
FIG. 8 is a diagram showing the relation between the helix angle of helical teeth and the noise level in toothed belts with a tooth pitch of 3 mm.
Figure 9:
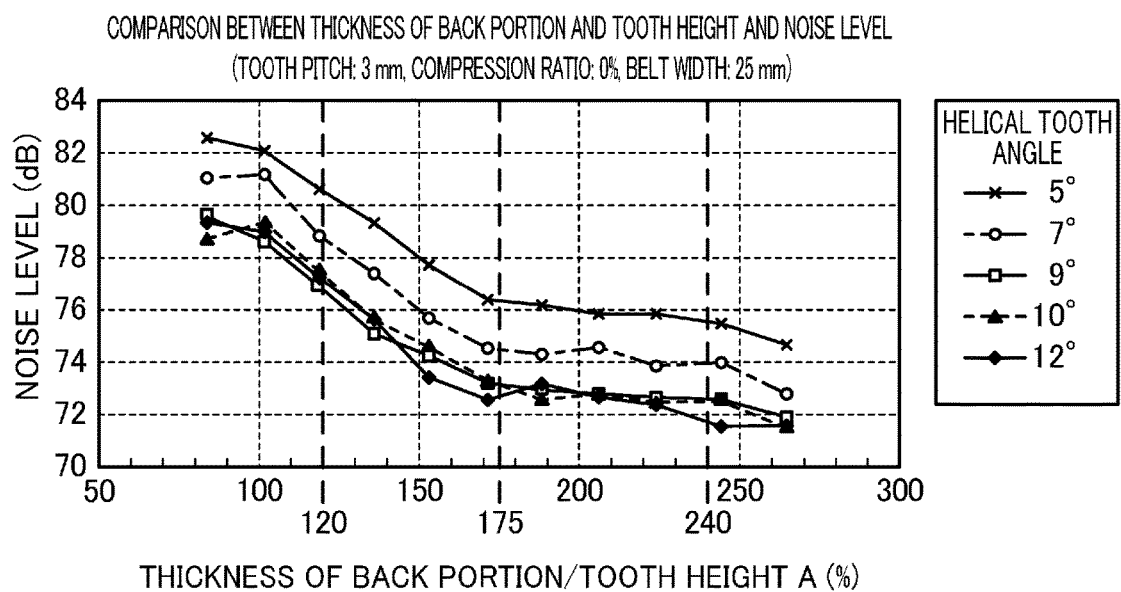
FIG. 9 is a diagram showing the relation between the ratio A (%) of the thickness of a back portion to the tooth height and the noise level in the toothed belts with a tooth pitch of 3 mm.

FIG. 8 is a diagram illustrating the result shown Table 2, where the abscissa represents the helical tooth angle of the toothed belt, and the ordinate represents the noise level. FIG. 9 is a diagram illustrating the result shown in Table 2, where the abscissa represents the ratio A, and the ordinate represents the noise level.

The results shown in Table 2 and FIG. 8 show that even if the pitch of the helical teeth was 3 mm, the noise level was able to be effectively reduced in the case where the helix angle of the helical teeth was in the range of 7 degrees to 10 degrees, both inclusive, as compared to the case where the helix angle of the helical teeth was smaller than 7 degrees or larger than 10 degrees. These results also show that the noise level was further reduced as the ratio A of the thickness of the back portion to the tooth height increased in the range of 84% to 264%.

The results shown in Table 2 and FIG. 9 show that even if the pitch of the helical teeth was 3 mm, the noise level was able to be effectively reduced by setting the helix angle of the helical teeth in the range of 7 degrees to 10 degrees, both inclusive, and setting the ratio A (%) of the thickness of the back portion to the tooth height to 120% or more, and the noise level was able to be further reduced by setting the ratio A to 175% or more. As described above, it is not preferable in view of durability that the ratio A of the thickness of the back portion to the tooth height be higher than 240%.

The above results show that in the case where the pitch of the helical teeth is in the range of 2 mm to 3 mm, both inclusive, the ratio A of the thickness of the back portion to the tooth height is preferably in the range of 120% to 240%, both inclusive, and more preferably in the range of 175% to 240%, both inclusive.

As described above, the toothed belt and the belt reduction gear according to the embodiment of the present disclosure can be used in, e.g., power steering systems for automobiles etc.

What is claimed is:

1. A toothed belt for a power steering system, comprising:
a back portion comprised of an elastic material; and
a plurality of helical teeth provided on an inner periphery of the back portion and disposed at a fixed pitch in a belt longitudinal direction, wherein
an angle θ between a tooth trace direction of the helical teeth and a belt lateral direction is in a range of 7 degrees to 10 degrees, both inclusive, and
a ratio A of a thickness tb of the back portion to a tooth height hb of the helical teeth, which is given by A=100×tb/hb, is in a range of 120% to 240%, both inclusive.

2. The toothed belt of claim 1, wherein the ratio A is in a range of 175% to 240%, both inclusive.

3. The toothed belt of claim 1, wherein a total thickness of the belt is 3.88 mm or less.

4. The toothed belt of claim 1, further comprising:
a cord embedded in the back portion so as to extend in the belt longitudinal direction.

5. The toothed belt of claim 4, wherein the helical tooth has tooth rubber provided on the inner periphery of the back portion and tooth cloth covering an inner peripheral surface of the tooth rubber.

6. The toothed belt of claim 5, wherein
each of the back portion and the tooth rubber mainly contains HNBR, CR, EPDM, or a mixture of two or more selected from HNBR, CR, and EPDM,
the cord is comprised of glass fiber, and
the tooth cloth is comprised of nylon.

7. The toothed belt of claim 1, wherein the pitch P of the helical teeth is in a range of 2 mm to 3 mm, both inclusive.

8. The toothed belt of claim 1, wherein a belt width W is in a range of 20 mm to 40 mm, both inclusive.

9. A belt reduction gear, comprising:
a drive pulley having a plurality of first helical teeth;
a driven pulley having a plurality of second helical teeth; and
a toothed belt for power steering, which includes a back portion comprised of an elastic material, and a plurality of third helical teeth provided on an inner periphery of the back portion so as to mesh with the first helical teeth and the second helical teeth and disposed at a fixed pitch in a belt longitudinal direction, and which is wound around the drive pulley and the driven pulley, wherein
an angle θ between a tooth trace direction of the third helical teeth and a belt lateral direction of the toothed belt is in a range of 7 degrees to 10 degrees, both inclusive, and
a ratio A of a thickness tb of the back portion to a tooth height hb of the third helical teeth, which is given by A=100×tb/hb, is in a range of 120% to 240%, both inclusive.

10. The belt reduction gear of claim 9, wherein the ratio A is in a range of 175% to 240%, both inclusive.

11. The belt reduction gear of claim 9, wherein
a compression ratio B of a tooth height hb of the third helical teeth with respect to a groove depth hp of the drive pulley and a groove depth hp of the driven pulley, which is given by B=100×(hb−hp)/hb, is B≤1.4%, and a ratio C of backlash BL between the toothed belt and the drive pulley and the driven pulley to the tooth pitch P of the third helical teeth, which is given by $C=100\times BL/P$, is $1.7\% \leq C \leq 2.5\%$.

12. The belt reduction gear of claim 9, further comprising:
a cord embedded in the back portion so as to extend in the belt longitudinal direction.

\* \* \* \* \*